(12) United States Patent
Acosta

(10) Patent No.: US 7,270,142 B2
(45) Date of Patent: Sep. 18, 2007

(54) INFLATION DEVICE WITH AUTOMATIC DISCONNECT

(76) Inventor: Carlos R. Acosta, 19 Morgans Bluff, San Antonio, TX (US) 78216-8504

( * ) Notice: Subject to any disclaimer, the term of this patent is extended or adjusted under 35 U.S.C. 154(b) by 388 days.

(21) Appl. No.: 11/028,398

(22) Filed: Jan. 3, 2005

(65) Prior Publication Data

US 2006/0144441 A1    Jul. 6, 2006

(51) Int. Cl.
    *F16K 15/20*    (2006.01)
(52) U.S. Cl. .................... 137/223; 137/231; 141/392; 152/415
(58) Field of Classification Search ................ 137/223, 137/229, 614.11, 224, 624.27, 231; 141/382, 141/383, 386, 392; 152/415; 251/149.6
    See application file for complete search history.

(56) References Cited

U.S. PATENT DOCUMENTS

| | | | | |
|---|---|---|---|---|
| 805,474 A * | 11/1905 | Lavertine et al. | ............ | 251/229 |
| 1,299,398 A * | 4/1919 | Kahn | .......................... | 137/231 |
| 1,405,706 A * | 2/1922 | Bentley | ........................ | 137/224 |
| 1,791,018 A * | 2/1931 | Williams | ............... | 137/614.11 |
| 2,107,732 A * | 2/1938 | Gustafason et al. | ... | 137/630.19 |
| 2,933,098 A * | 4/1960 | Lisiak | .......................... | 137/224 |
| 3,001,548 A * | 9/1961 | Van Hecke | ............ | 137/596.16 |
| 3,937,253 A * | 2/1976 | Lilja | ...................... | 137/625.18 |
| 4,076,037 A | 2/1978 | Perez | | |
| 4,236,518 A * | 12/1980 | Floyd | ..................... | 137/614.14 |
| 4,258,799 A * | 3/1981 | Eckman | ....................... | 173/169 |
| 4,759,502 A * | 7/1988 | Pomponi et al. | ............ | 137/595 |
| 5,092,362 A * | 3/1992 | Yie | .......................... | 137/596.1 |
| 5,257,642 A | 11/1993 | Worth | | |
| 5,365,967 A | 11/1994 | Moore | | |
| 5,857,481 A | 1/1999 | Zimmerman | | |
| 6,035,885 A * | 3/2000 | Schuessler et al. | .... | 137/315.27 |
| 6,279,599 B1 | 8/2001 | Chen | | |

FOREIGN PATENT DOCUMENTS

EP    1006310 A2 *   7/2000

* cited by examiner

*Primary Examiner*—Eric Keasel
*Assistant Examiner*—Craig Price
(74) *Attorney, Agent, or Firm*—David Allen Hall

(57) ABSTRACT

An apparatus that injects fluid into an inflatable device, dynamically monitors the pressure inside the device, and automatically terminates the inflation and disconnects from the inflatable device when the pressure inside the device reaches a predetermined value preset by the operator. After securing a chuck to the valve of an inflatable device by simply pulling a trigger similar to that of a pistol, the operator initiates the inflation and does not need to intervene further.

8 Claims, 10 Drawing Sheets

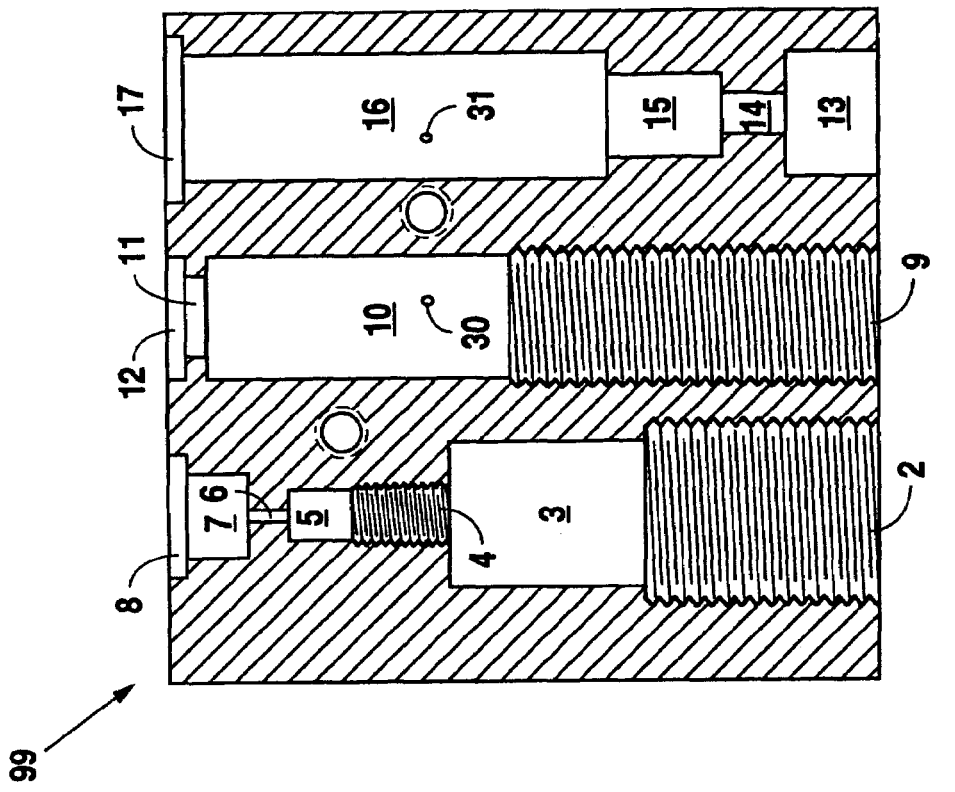
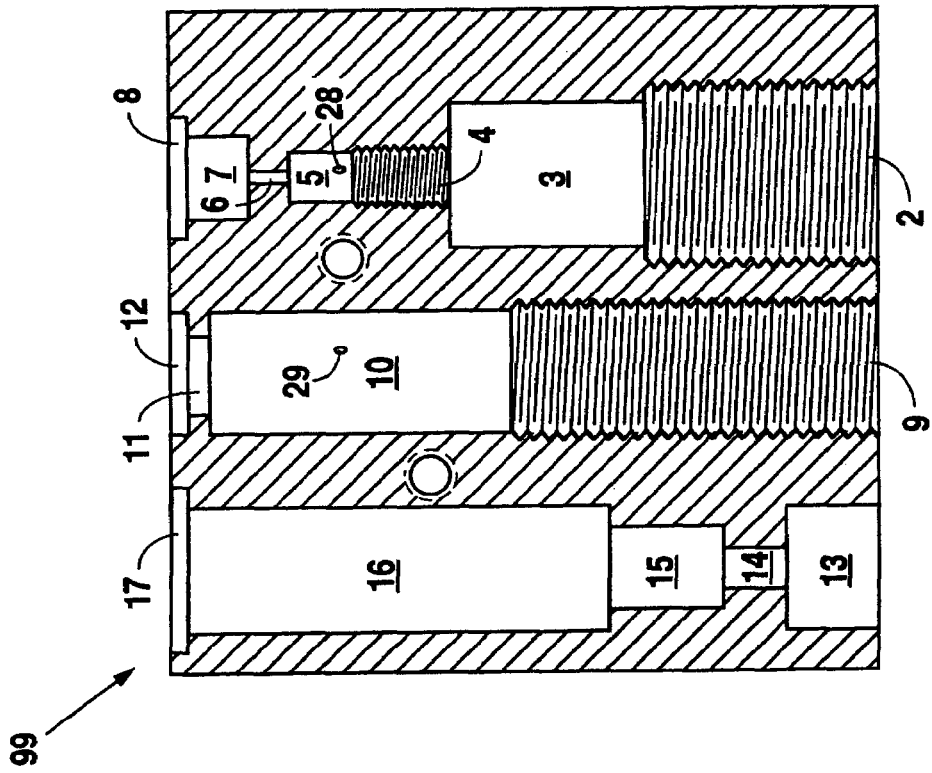

INFLATION DEVICE WITH AUTOMATIC DISCONNECT

BACKGROUND OF THE INVENTION

1. Field of the Present Invention

The present invention relates to the fields of inflation systems and safety devices.

2. Status of the Related Art

Current art does not contain all the features claimed by the present invention. U.S. Pat. No. 5,365,967 (Moore, 1994) discloses a specially built tire valve with a built-in pressure indicator that emits a whistling sound when a preset pressure is attained. No adjustment feature on the preset pressure level is disclosed or claimed. U.S. Pat. No. 5,257,642 (Worth, 1993) discloses a pressure relief valve that can be inserted into a tire valve specially built with an integral on-off feature. The relief valve is preset to discharge air to the environment when a tire is inflated to a pressure greater than a predetermined value. The Moore and Worth inventions require valves that differ greatly from the industry standard and add undesirable wheel rim mass that can cause wheel balancing problems. Neither invention offers the safety benefit of hands-free, automatic disconnect of the inflation system at a desired pressure.

U.S. Pat. No. 5,857,481 (Zimmerman, 1999) discloses a tire inflation system that permits an operator to open a valve and inflate a remotely located tire through a flexible hose. The operator can set a desired tire pressure level on a pressure regulator located near the valve, and the hose can be disconnected from the regulator when the desired pressure is attained. U.S. Pat. No. 6,279,599 (Chen, 2001) discloses an air hose assembly that permits conventional inflation, and also provides for air release with a sliding mechanism, concentric with the hose assembly, with which the operator can hold the valve open until the desired amount of air is released. Neither invention offers the safety benefit of hands-free, automatic disconnect of the inflation system at a desired pressure.

U.S. Pat. No. 4,076,037 (Perez, 1978) discloses a safety valve that threads onto a conventional tire valve stem and relieves pressure above a preset value. It offers no inflation capability.

SUMMARY OF THE INVENTION

Injection of a fluid into an inflatable device is herein referred to as an "inflation event." The component of an inflatable device that permits fluid ingress is herein called a "valve," and the central core valve component that must be depressed to initiate fluid flow into the valve is herein called a "valve stem." The component of an inflation device that interfaces directly with an inflatable device's valve is herein called a "chuck." As herein used, "piston" refers to a component that slides inside a confined space such as a cylinder, and to a diaphragm-like or hinge-like component capable of moving from one position to another at the urging of gas pressure or a spring. As herein used, "spring" means any device or material capable of storing kinetic energy and returning at least a portion of that stored energy as kinetic energy. When used herein, "chamber" means an enclosed space that may or may not have one or more openings that provide communication with other enclosed spaces or with the atmosphere.

The present invention chuck provides easy, quick, and secure communication between an inflation device and an inflatable device. The present invention alleviates the major inconveniences and safety weaknesses inherent in inflation events carried out with state of the art inflation devices. After positioning the chuck on the valve of an inflatable device and pulling a trigger, the present invention requires no further operator interaction with the chuck.

For safety, the operator may initiate an inflation event entirely outside a protective cage that houses an inflatable device. For example, the remote feature enhances the safety of an inflation event such as the inflation of a truck tire with compressed air. The operator does not even have to put a hand inside the cage to hold the chuck onto a valve during the inflation process.

Fluid injected by the present invention is not limited to compressed air. The supply fluid reservoir can be any container or line system providing storage of a fluid, including, but not limited to a liquid, a gas, shop air, bottled gas, and a tank filled by a compressor. The reservoir can also be a direct connection to a compressor or pump.

With the present invention, a predetermined pressure inside an inflatable device causes the chuck to be automatically disconnected and released from the valve of the inflatable device. Such automatic disconnect without operator intervention at the valve assures a safe, handsfree conclusion of the inflation process. Disconnect at a predetermined pressure also assures a consistent inflation process when several devices are to be inflated to identical pressures. The safety and consistency of the present invention are valuable, desirable features in an assembly line environment such as, for example, a bicycle, motorcycle, automobile, truck, or tractor production, maintenance, or repair facility.

The present invention provides a means for setting the pressure at which the chuck will be automatically disconnected from the valve. This can be done by someone during the manufacturing, distribution, or retail stage, or by the operator. The setting can be permanent or variable.

BRIEF DESCRIPTION OF THE DRAWINGS

The structure and operation of the invention will become apparent upon reading the following detailed description of the preferred embodiment and upon reference to the accompanying drawings in which like details are labeled with like identification numbers throughout, and in which:

FIG. 2A is a cross-sectional side view of one half of the handle shell.

FIG. 2B is a cross-sectional side view of the half of the handle shell opposite that of the half shown in FIG. 2A.

DETAILED DESCRIPTION OF THE PREFERRED EMBODIMENT

Inventor presents herein the best mode for carrying out the present invention in terms of its preferred embodiment, depicted within the aforementioned drawings.

Figure 1:
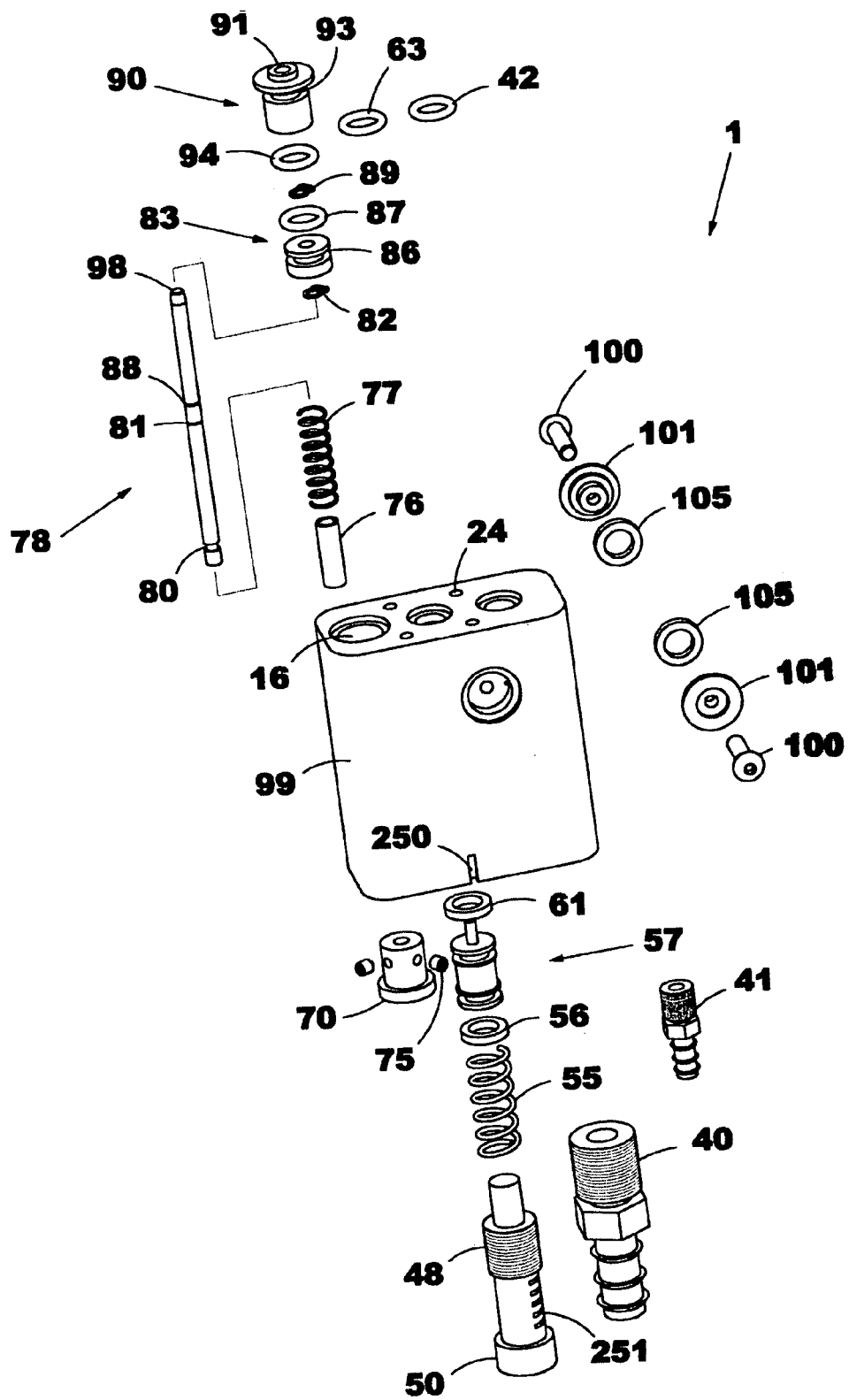
FIG. 1 is an exploded view of the handle assembly, so-called because it is the portion of the preferred embodiment that is generally held by the operator during an inflation event.

FIG. 1 is an exploded view of handle assembly 1. From a reservoir or other source not shown, pressurized fluid is introduced into an interchangeable fluid supply connector 40 connected to handle shell 99.

FIG. 2A is a cross-sectional view of handle shell 99. Connector 40 is threaded into threaded hole 2 of handle shell 99. The pressurized fluid that flows through connector 40 flows into the section of filter 41 (see FIG. 1) that occupies chamber 3 of handle shell 99, through the section of filter 41 that is threaded into threaded hole 4, and through chambers 5, 6, and 7. Groove 8 houses O-ring 42, discussed below as part of handle assembly 1.

Figure 3:
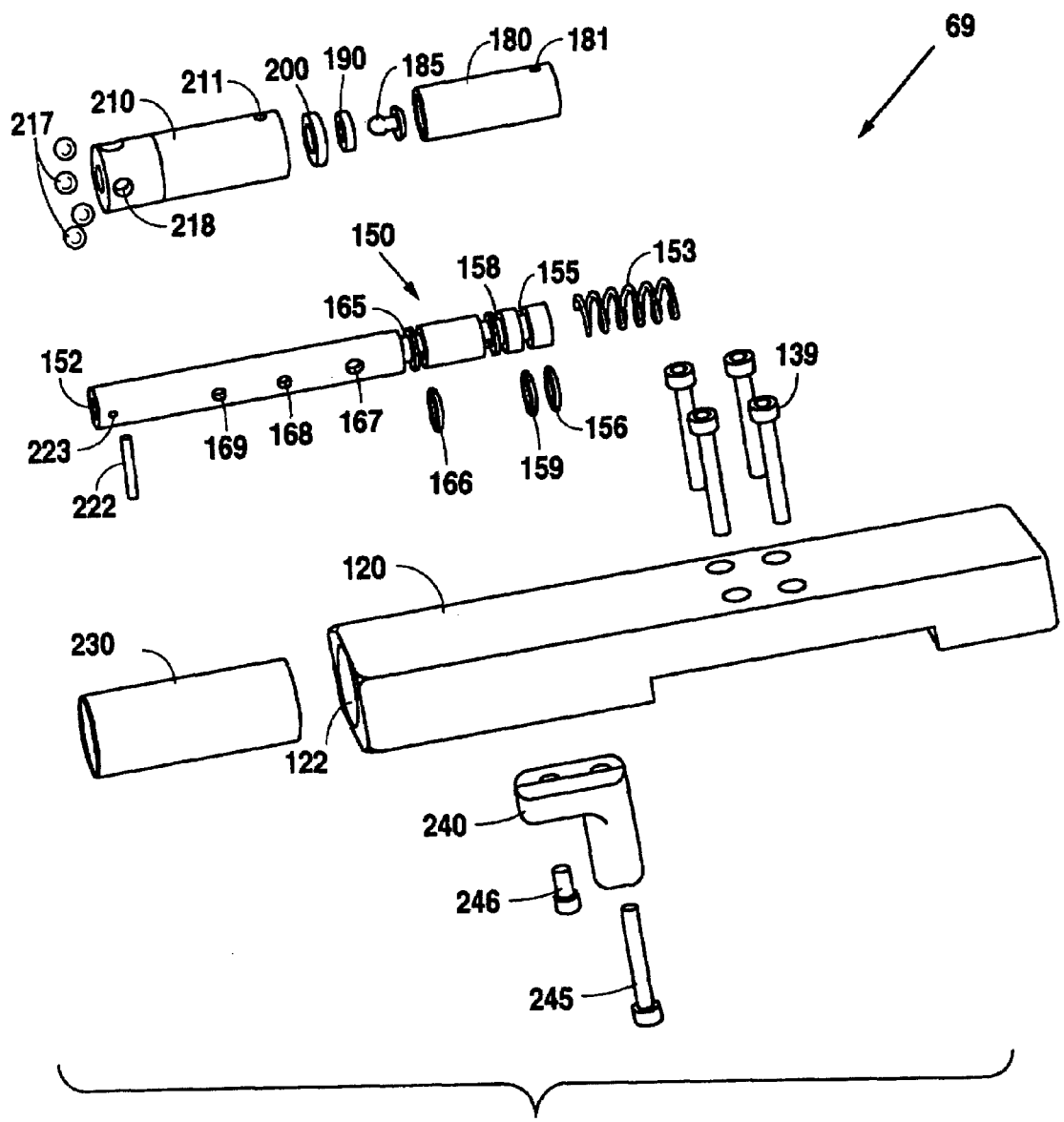
FIG. 3 is an exploded view of the barrel assembly that mates with the handle assembly.

FIG. 3 is an exploded view of barrel assembly 69. O-rings 156, 159, and 166 are respectively installed in metering tube grooves 155, 158, and 165. Compliant washer 200, rigid spacer 190, and valve stem actuator 185 are installed inside lower chuck body 210. Middle chuck body 180 is inserted into lower chuck body 210, and metering tube 150 is inserted into middle chuck body 180 so that diametrical pin hole 181 in middle chuck body 180, diametrical pin hole 211 in lower chuck body 210 and diametrical pin hole 223 in metering tube 150 are aligned. Metering tube 150 and middle and lower chuck bodies 180 and 210 are pinned together with cylindrical pin 222 pressed through the three mating pin holes.

Heretofore, for purpose of description, the open end of barrel 120 will be referred to as the front end of barrel 120 and barrel assembly 69, and the direction in which the front end of barrel 120 and barrel assembly 69 face will be referred to as "forward." Any component orientation or motion coincident with that direction will be considered to the front or "forward." Any component orientation or motion opposite to that direction will be considered to the rear or "rearward."

Referring again to FIG. 3, compression spring 153, with an inside diameter smaller than the outside diameter of metering tube 150 and an outside diameter smaller than the inside diameter of barrel central chamber 122, is installed inside barrel central chamber 122. Internally tapered upper chuck body 230 is pressed into the front end of barrel 120 so that the largest diameter of the chuck body 230 taper faces forward.

In the preferred embodiment, chuck holes 218 are cut with a ball end mill circumferentially on equally spaced radii and near the forward end of lower chuck body 210. The resulting configuration of a chuck hole 218 is a curved hole on the outer surface of lower chuck body 210 that tapers inward to a curved hole on the inside surface of lower chuck body 210, the outer hole having a larger diameter than the inner hole.

Chuck balls 217 are sized so that they cannot pass entirely through chuck holes 218. When seated in a chuck hole 218, some portion of a chuck ball 217 protrudes inside the inner surface of lower chuck body 210, and some other portion of a chuck ball 217 protrudes outside the outer surface of lower chuck body 210. Chuck balls 217 are seated in chuck holes 218, and the end of metering tube 150 in which O-ring 156 is seated is inserted through upper chuck body 230 and into barrel chamber 122. Lower chuck body 210 is inserted into upper chuck body 230 far enough to assure that chuck balls 217 are captured between chuck holes 218 and the tapered inside diameter of upper chuck body 230.

Figure 4A:
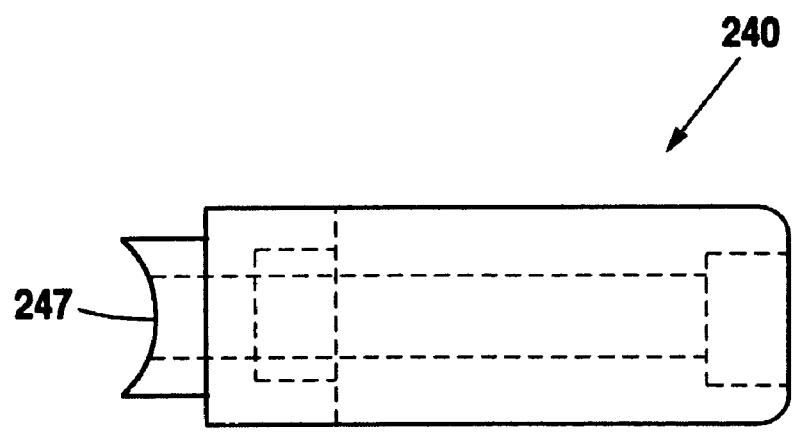
FIG. 4A is a rear plan view of the trigger, a component of the barrel assembly.
Figure 4B:
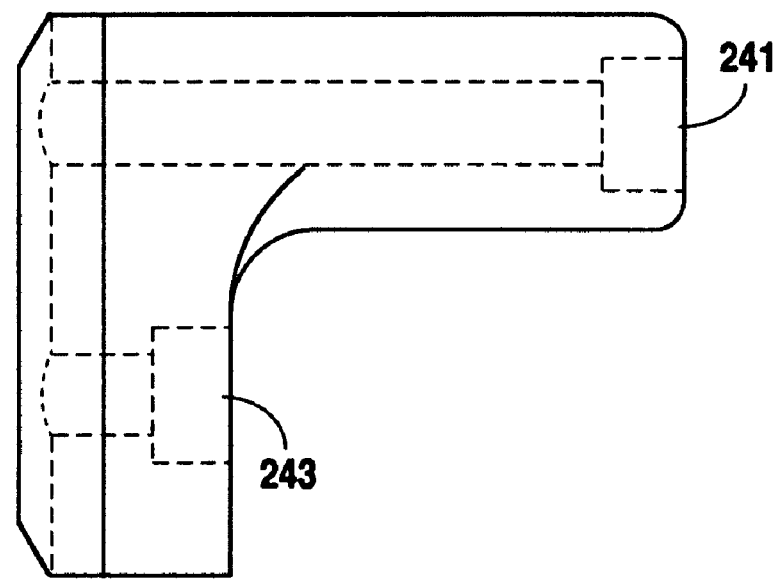
FIG. 4B is a side plan view of the trigger.
Figure 5A:
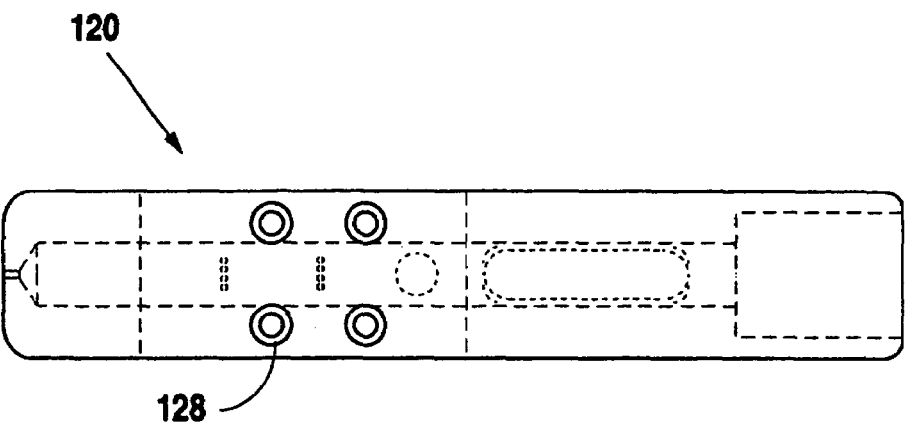
FIG. 5A is a top plan view of the barrel, a component of the barrel assembly.
Figure 5B:
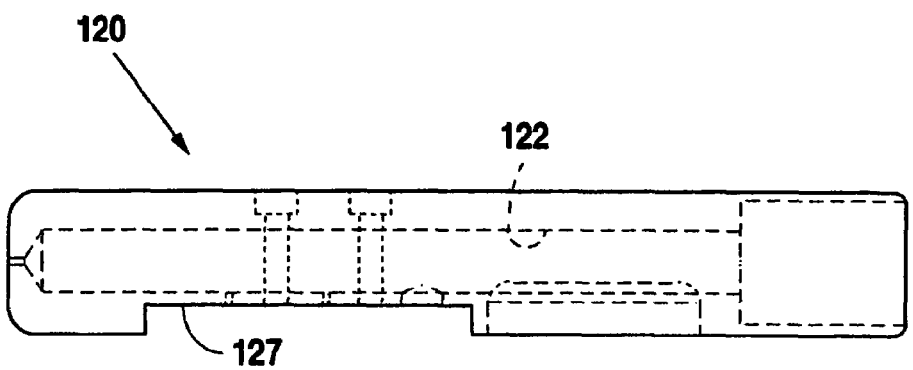
FIG. 5B is a side plan view of the barrel.
Figure 5C:
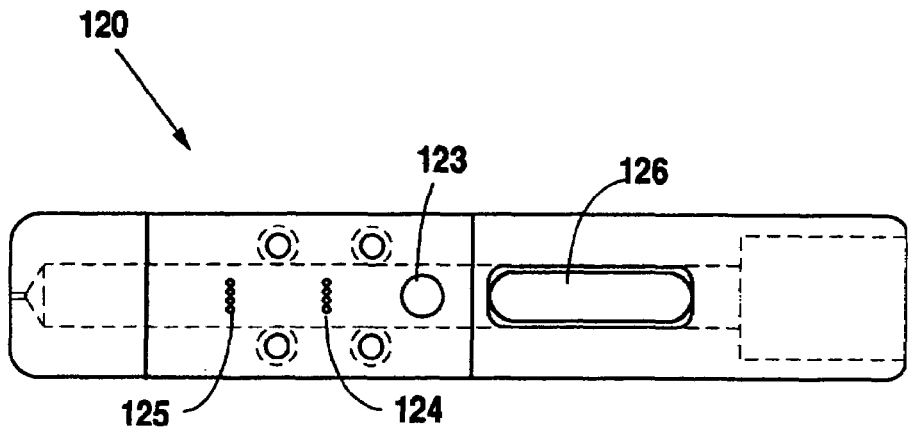
FIG. 5C is a bottom plan view of the barrel.

FIGS. 4A and 4B show trigger 240 and its hemispherical slot 247 that is inserted into barrel slot 126, shown in FIG. 5C. Hemispherical trigger slot 247 receives metering tube 150, and trigger 240 is attached to metering tube 150 with screws 245 and 246 that communicate through trigger holes 241 and 243, respectively, with metering tube threaded holes 168 and 169, respectively, when metering tube 150 is inserted into barrel central chamber 122 (see FIG. 3). Thus attached to trigger 240, metering tube 150 is captured within, and is capable of sliding inside, barrel central chamber 122 when an operator slides trigger 240 in barrel slot 126.

In FIG. 1 it can be seen that release piston 83 and its seated O-ring 87 are concentrically installed on release pin 78 and held in place between spring clips 82 and 89 that are seated in grooves 81 and 88, respectively. Release pin 78 mounts through hole 91 in release pin guide 90 that is seated in handle chamber 16 (see FIG. 2A), and communicates with barrel hole 123 (see FIG. 5C). Handle assembly 1 is inserted into cutout 127 of barrel 120 (see FIG. 5B) and is attached to barrel 120 with four screws 139 (see FIG. 3) that communicate with threaded holes 24 in handle shell 99 through barrel counterbored clearance holes 128.

Heretofore, for purposes of description of the combined handle and barrel assemblies 1 and 69, the end of handle assembly 1 that receives fluid supply connector 40 will be referred to as the "bottom end," and the opposite end (the end joined with barrel 120) will be referred to as the "top end." Motion in the direction toward the top and bottom ends will be referred to as "upward" and "downward," respectively.

No Fluid Flow through Barrel Assembly: Absent external force on trigger 240, compression spring 153 seated against the rear wall of barrel central chamber 122 exerts a longitudinal force against the rear end of metering tube 150. That force pushes metering tube 150 and attached trigger 240 forward until the front end of trigger 240 impinges the front end of barrel slot 126. The barrel assembly parts are dimensioned so that when trigger 240 is held in the foregoing forward position by spring 153, chuck balls 217 seated in chuck holes 218, are captured by lower chuck body 210 and upper chuck body 230.

Figure 6:
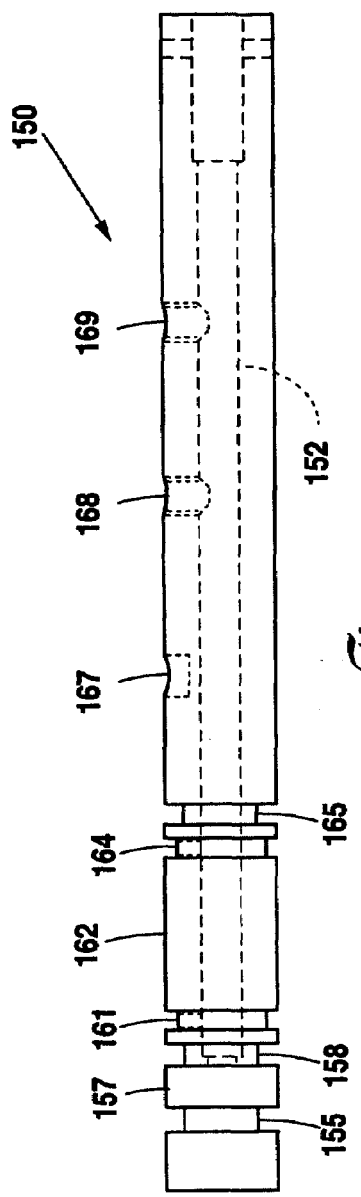
FIG. 6 is a plan view of the metering tube, a component of the barrel assembly.

With metering tube 150 in its forward position, O-rings 156 and 159 approximately span barrel holes 125 so that fluid at reservoir pressure in handle chamber 7 is laterally confined by O-ring 42 in groove 8, and communicates through holes 125 to confinement in the annular chamber defined by the outer surface of metering tube section 157, the inner surface of barrel central chamber 122, and O-ring 156 in groove 155 and O-ring 159 in groove 158 (see FIG. 6).

Figure 8:
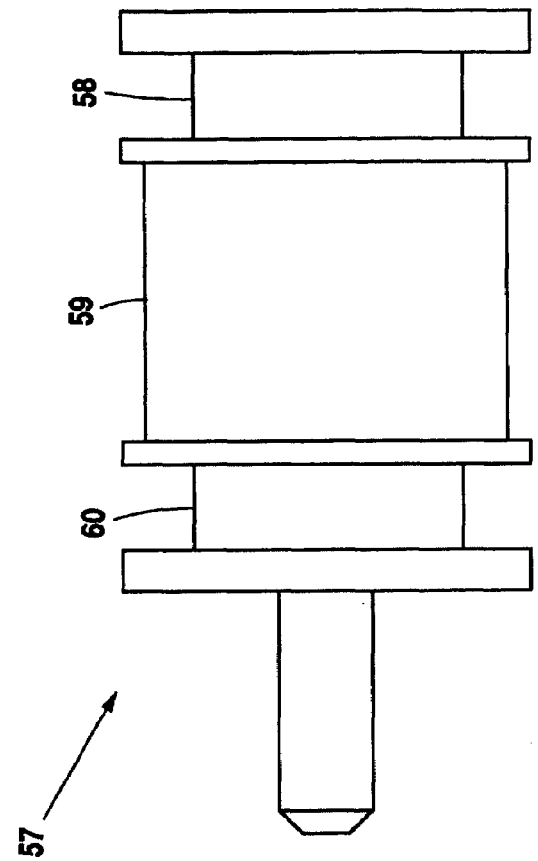
FIG. 8 is a plan view of the release piston, a component of the handle assembly.
Figure 7:
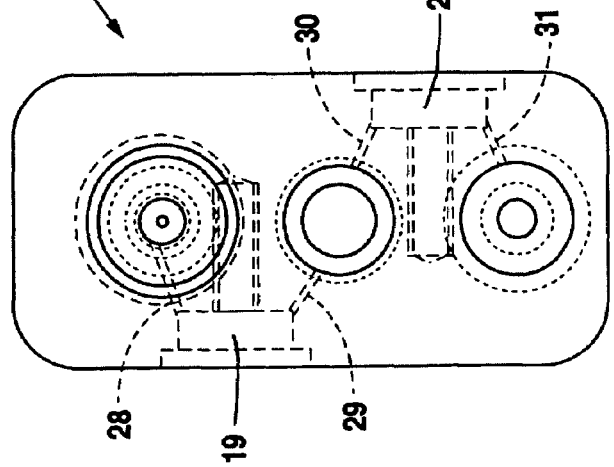
FIG. 7 is a bottom plan view of the handle shell that shows, among other features, the viewing directions of FIGS. 2A and 2B.

FIG. 7 shows that handle angled chamber 28 joins handle chamber 5 and handle chamber 19 (sealed during assembly by means of O-ring 105, port cover 101, and screw 100). FIG. 7 also shows that handle angled chamber 29 joins handle chambers 19 and 10. Regulator 57, discussed in detail below and shown in FIG. 8, is located near or at its uppermost or topmost position in handle chamber 10 so that fluid from angled chamber 29 is confined in the annular chamber defined by the outer surface of section 59 of regulator piston 57, the inner surface of handle chamber 10, and O-ring 56 seated in groove 58 and O-ring 61 seated in groove 60.

Thus, with metering tube 150 in its forward position, fluid flow is blocked, and fluid pressure in the annular chamber between the outer surface of metering tube section 157, the inner surface of barrel central chamber 122, and O-rings 156 and 159 stabilizes at the fluid reservoir pressure. Consequently, when trigger 240 and metering tube 150 are spring loaded in their forward positions, there is no fluid flow through the forward end of metering tube 150 and lower chuck body 210.

Fluid Flow through Barrel Assembly into the Atmosphere: An operator initiates fluid flow through lower chuck 210 by pulling trigger 240 rearward. When rearward motion of trigger 240 is sufficient to cause metering tube cavity 167 to line up with barrel hole 123, chamfered tip 98 of release pin 78 in handle chamber 16 seats in metering tube cavity 167. Release pin 78 is guided by release pin guide 90 seated in handle chamber 16 and sealed with O-ring 94 seated in release pin guide groove 93. Release pin 78 is urged into metering tube cavity 167 by compression spring 77 and spacer 76, concentric to release pin 78 in handle chamber 16, that exerts a force that is parallel to release pin 78 and that is imposed on release piston 83 concentrically attached to release pin 78 between release pin grooves 81 and 88. With chamfered tip 98 of release pin 78 seated in metering tube cavity 167, metering tube 150 is locked in its most rearward position, and further movement of trigger 240 and metering tube 150 is precluded.

With metering tube 150 in its rearward position, the annular chamber defined by the outer surface of metering tube section 162, the inner surface of barrel central chamber 122, and O-ring 159 seated in groove 158 and O-ring 166 seated in groove 165 approximately spans barrel holes 124 and 125. In this configuration, fluid confined by O-ring 42 seated in groove 8 flows through handle chamber 7, through barrel holes 125, and into the annular chamber between the outer surface of metering tube section 162, the inner surface of barrel central chamber 122, and O-rings 159 and 166. From that annular chamber the fluid flows through metering tube holes 161 and 164 into metering tube center bore 152. If lower chuck body 210 is not properly attached to an inflatable device, the fluid will escape into the atmosphere through the forward end of metering tube 150 and lower chuck body 210.

To stop the escape of fluid, an operator may pull release knob 70 downward (away from the bottom end of handle shell 99). Knob 70 is attached to release pin 78 with set screws 75 that impinge on release pin groove 80. Piston 83 is concentrically secured to release pin 78 between release pin grooves 81 and 88. Pulling knob 70 downward with sufficient force to overcome the force of compression spring 77 seated against piston 83 pulls chamfered tip 98 of release pin 78 out of metering tube cavity 167. Compressed spring 153 then pushes metering tube 150 and attached trigger 240 into their forward positions, thus blocking barrel holes 125 and stopping the flow of fluid through barrel holes 125 and the forward end of metering tube 150 and lower chuck body 210. Consequently, with trigger 240 and metering tube 150 spring loaded in their forward positions, there is no fluid flow through the forward end of metering tube 150 and lower chuck body 210.

Figure 9A:
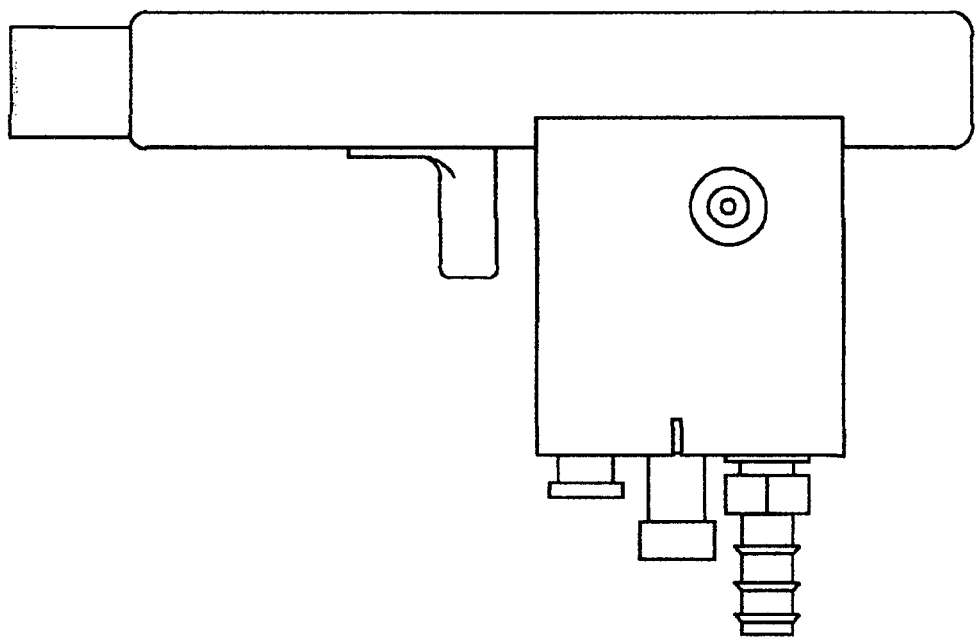
FIG. 9A is a plan side view of the present invention.
Figure 9B:
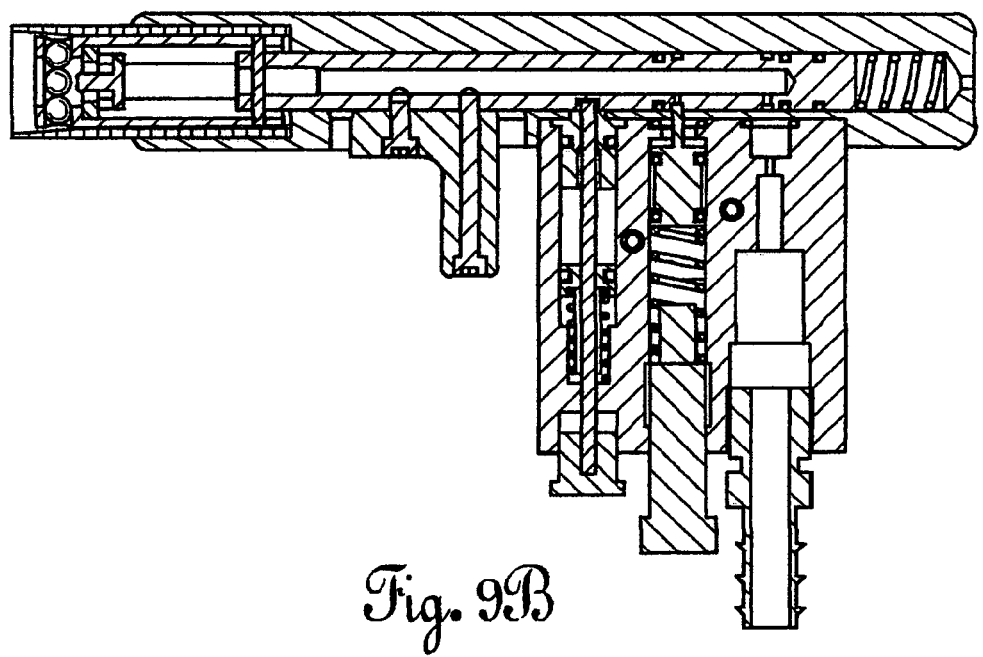
FIG. 9B is a cross-sectional side view of the present invention.
Figure 9C:
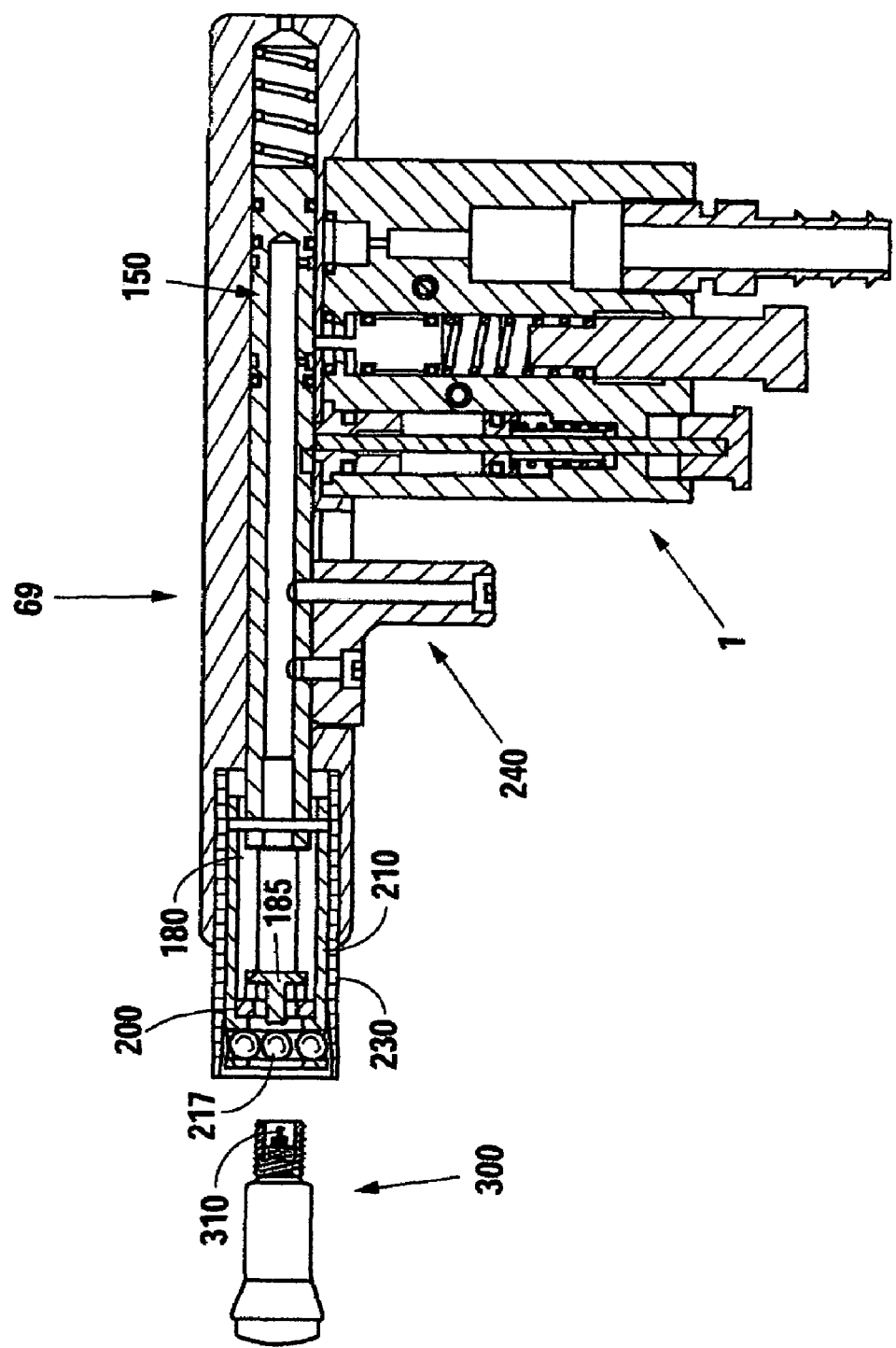
FIG. 9C is a partial cross-sectional cut-away drawing of the chuck portion of the present invention and the valve of an inflatable device.
Figure 9D:
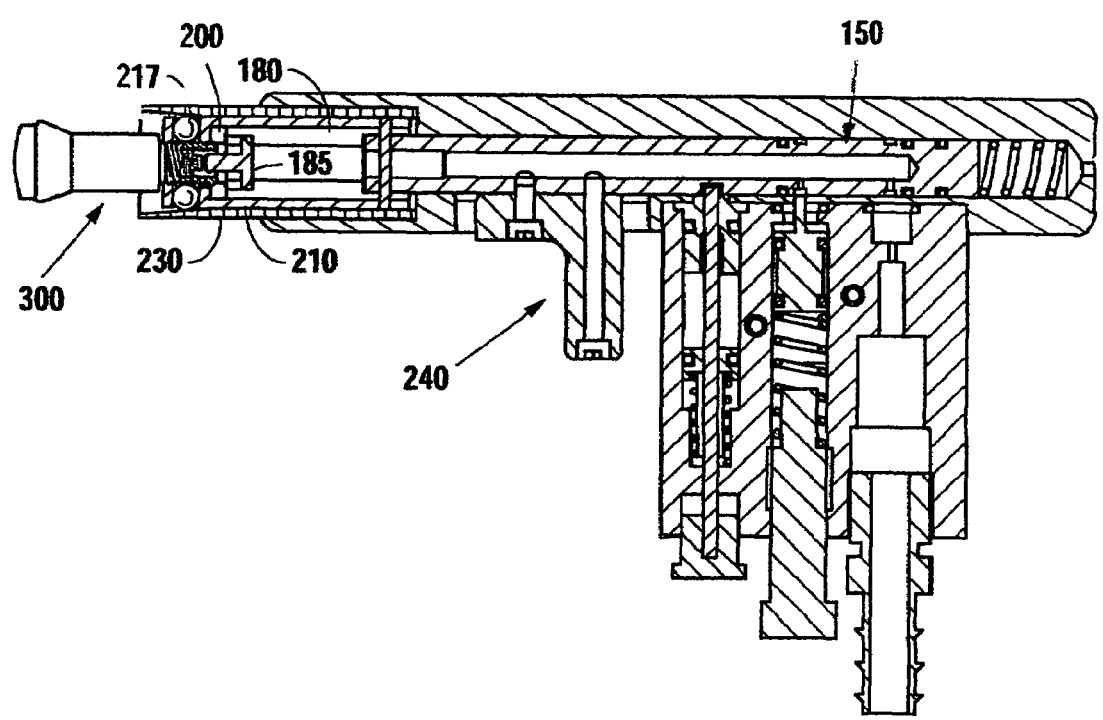
FIG. 9D is a partial cross-sectional cut-away drawing of the chuck portion of the present invention grasping the valve of an inflatable device.

Fluid Flow through Barrel Assembly into an Inflatable Device: Communication between a fluid reservoir and an inflatable device requires proper attachment of a chuck to the inflatable device's valve. For practice of the present invention, the operator pushes upper chuck body 230 and lower chuck body 210 (see FIGS. 9C and 9D) onto the valve 300 of an inflatable device so that rubber washer 200 contacts the valve, and valve stem actuator 185 depresses the valve stem 310 sufficiently to permit fluid flow into the inflatable device. Chuck balls 217 contact the outer surface of the valve. Applying forward force to handle and barrel assemblies 1 and 69 sufficient to assure that valve stem actuator 185 keeps the valve stem of the inflatable device depressed, the operator pulls trigger 240 rearward. Because metering tube 150 is pinned to middle and lower chuck bodies 180 and 210, and lower chuck body 210 receives the valve of an inflatable device, pulling trigger 240 rearward results in forward movement of handle and barrel assemblies 1 and 69, respectively. Consequently, because upper chuck body 230 is part of barrel assembly 69, the tapered inside surface of upper chuck body 230 moves forward onto lower chuck body 210, forcing chuck balls 217 deeper in chuck holes 218. Thus the portions of chuck balls 217 protruding inside the inner diameter of lower chuck body 210 impose a circumferential radial force on the captured valve of the inflatable device. As the narrowing section of the tapered inside surface of upper chuck body 230 is forced further forward, chuck balls 217 grip the valve with greater force.

When rearward motion of trigger 240 is sufficient to cause metering tube cavity 167 to line up with barrel hole 123, chamfered tip 98 of release pin 78 in handle chamber 16 seats in metering tube cavity 167. Release pin 78 is urged into metering tube cavity 167 by compression spring 77 as described above. With chamfered tip 98 of release pin 78 seated in metering tube cavity 167, metering tube 150 is locked in its most rearward position, and further movement of trigger 240 and metering tube 150 is precluded.

With metering tube 150 in its rearward position, the annular chamber defined by the outer surface of metering tube section 162, the inner surface of barrel central chamber 122, and O-ring 159 seated in groove 158 and O-ring 166 seated in groove 165 is approximately centered over barrel holes 124 and 125. In this configuration, fluid confined by O-ring 42 seated in groove 8 flows freely through handle chamber 7, through barrel holes 124 and 125, and into the annular chamber between the outer surface of metering tube section 162, the inner surface of barrel central chamber 122, and O-rings 159 and 166. From that annular chamber the fluid flows through metering tube holes 161 and 164, into metering tube center bore 152, through lower chuck body 210, and into the inflatable device valve.

The operator can stop the inflation process at any time by manually pulling release knob 70 downward (away from handle shell 99). Additionally, the present invention provides for termination of the inflation process with automatic disconnect of lower chuck body 210 from the valve of the inflatable device and automatic cessation of fluid flow from the barrel assembly at a predetermined inflation pressure.

Automatic Chuck Disconnect: Before the inflation process begins, the operator selects and sets a pressure at which the inflation process will be terminated. FIG. 1 shows that the operator adjusts the present invention to achieve a desired pressure in the inflatable device by rotating pressure adjuster 50 clockwise to compress spring 55 and counterclockwise to relieve spring 55. The function that spring 55 performs in the regulation of the pressure in the inflatable device is discussed below. The desired pressure is indicated by the position, relative to handle marker 250, of visible scale 251 on pressure adjuster 50.

Handle assembly 1 contains a mass flow rate restrictor. FIGS. 2A and 2B show that handle chamber 6 has a cross-sectional area significantly smaller than any of the other fluid flow chambers in the present invention. The ganged chamber comprised of barrel holes 125 and the ganged chamber comprised of metering tube holes 161 and 164 each constitute a chamber with a combined cross-sectional area significantly larger than that of handle chamber 6 and the inflatable device valve. For example, in the preferred embodiment, handle chamber 6 and each barrel hole 125 has a diameter of 0.031 in. Therefore, the combined cross-sectional area available for fluid flow in the four barrel holes 125 of the preferred embodiment is four times that of the cross-sectional area available for fluid flow in handle chamber 6. In the preferred embodiment, metering tube holes 161 and 164 have a diameter of 0.046 in. Therefore, the combined cross-sectional area available for fluid flow in metering tube holes 161 and 164 of the preferred embodiment is 4.4 times that of the cross-sectional area available for fluid flow in handle chamber 6, and the cross-sectional area in the inflatable device valve is approximately three times that of the cross-sectional area available for fluid flow in the handle chamber 6.

Therefore, handle assembly 1 contains a mass flow rate restrictor. When the inflation process begins, fluid pressure inside all chambers downstream of handle chamber 6 stabilizes at the same pressure present in the inflatable device, while fluid pressure in handle chambers 2 through 6 is equal to the pressure of the fluid reservoir. Because of friction and the flow restriction imposed by handle chamber 6, communication between a fluid reservoir and an inflatable device through handle assembly 1 and barrel assembly 69 does not instantaneously raise the inflatable device pressure to that of the reservoir. Rather, the pressure of the fluid in the chambers downstream of handle chamber 6, and in the inflatable device, gradually increases as fluid flows through the restricted handle chamber 6.

During the inflation process, the fluid pressure in metering tube center bore 152, metering tube holes 161 and 164, barrel holes 124 and 125, and handle chambers 10 and 11 rise at substantially the same rate as the pressure in the inflatable device. The increasing fluid pressure in handle chambers 10 and 11 gradually increases the force exerted by the fluid on the top surface of regulator piston 57 that is fitted inside handle chamber 10 with O-rings 56 and 61 seated in regulator piston grooves 58 and 60, respectively (see FIG. 8). Where handle assembly 1 joins barrel assembly 69, fluid in handle chamber 11 is confined by O-ring 63 seated in groove 12. The increasing force pushes piston 57 downward, compressing spring 55. As regulator piston 57 moves downward, it approaches an opening created where angled chamber 30 intersects with handle chamber 10 (see FIG. 2B). That opening in the wall of handle chamber 10 permits communication, through angled chamber 30, between handle chambers 10 and 22. Angled chamber 30 normally vents to the atmosphere through handle chamber 22 (sealed during assembly by means of O-ring 105, port cover 101, and screw 100) and angled chamber 31 that in turn communicates with the atmosphere through handle chambers 16, 15, 14, and 13.

As regulator piston 57 moves further downward in handle chamber 10, O-Ring 56 passes over the opening to angled chamber 30. At that point the annular chamber defined by the outer surface of section 59 of regulator piston 57, the inner surface of handle chamber 10, and O-rings 56 and 61 is brought into communication with angled chamber 30. That annular chamber maintains pressure equal to that of the fluid reservoir, such pressure being communicated from the reservoir through handle chamber 5, angled chamber 28, handle chamber 19 (sealed during assembly by means of O-ring 105, port cover 101, and screw 100), and angled chamber 29 that intersects handle chamber 10 at a location upward from the point of intersection of angled chamber 30 (see FIGS. 2A and 2B). When the annular chamber defined by the outer surface of section 59 of regulator piston 57, the inner surface of handle chamber 10, and O-rings 56 and 61 simultaneously spans the intersections of angled chambers 29 and 30 with handle chamber 10, the pressure of the fluid in angled chamber 30 will immediately change from atmospheric to that of the fluid reservoir.

When the pressure change in angled chamber 30 occurs is dependent on the mechanical properties and initial length of spring 55. When the inflation process begins, the initial length of spring 55 is determined by the position of pressure adjuster 50 and its shank 48 in threaded handle chamber 9. Thus the present invention enables an operator to adjust, with pressure adjuster 50 aided by marker 250 and a visible scale 251 on pressure adjuster 50, the initial compressive force in spring 55, thereby setting the inflation pressure that initiates the series of actions that overcomes the force in spring 55 and automatically disconnects lower chuck body 210 from the inflatable device valve.

When angled chamber 30 achieves reservoir pressure, handle chamber 22, angled chamber 31, and handle chamber 16 substantially simultaneously achieve reservoir pressure. Where handle assembly 1 joins barrel assembly 69, fluid in handle chamber 16 is confined by O-ring 94 seated in groove 17. Fluid at reservoir pressure in handle chamber 16 exerts a force on the top surface of release piston 83. Because the bottom surface of release piston 83 is exposed to atmospheric pressure in handle chambers 13, 14, and 15 and around release knob 70, and because O-ring 87 seated in release piston groove 86 seals the periphery of release piston 83 in handle chamber 16, the increasing pressure on the top surface of release piston 83 pushes the piston downward.

As release piston 83 moves downward, attached release pin 78 moves with it, thereby disengaging chamfered tip 98 of release pin 78 from metering tube cavity 167. Spring 153, seated in the rear of barrel central chamber 122, then thrusts the barrel and handle assemblies 69 and 1 rearward, away from metering tube 150. Thus the effect of spring 153 is to push barrel 120 and upper chuck body 230 away from pinned middle and lower chuck bodies 180 and 210 and metering tube 150. As upper chuck body 230, with its internal taper, is pushed away from lower chuck body 210, the force exerted on chuck balls 217 by upper chuck body 230 decreases, thereby reducing the radial forces exerted by chuck balls 217 on the inflatable device valve. At some reduced level of force exerted by chuck balls 217 on the inflatable device valve, the spring-loaded valve stem pushing against valve stem actuator 185 will eject lower chuck body 210, metering tube 150, and barrel and handle assemblies 69 and 1, and the inflation process will terminate.

When the present invention inflation device has been ejected from the inflatable device valve, spring 153 maintains metering tube 150 in its forward position, and the annular chamber defined by the outer surface of metering tube section 162, the inner surface of barrel central chamber 122, and O-rings 159 and 166 no longer straddles barrel holes 124 and 125. Rather, O-rings 156 and 159 approximately span barrel holes 125 so that fluid in handle chamber 7 communicates through holes 125 with the annular chamber defined by the outer surface of metering tube section 157, the inner surface of barrel central chamber 122, and O-rings 156 and 159. Where handle assembly 1 joins barrel assembly 69, fluid in handle chamber 7 is confined by O-ring 42 seated in groove 8. Thus, when the inflation process has been terminated, and metering tube 150 is in its forward position, fluid flow at reservoir pressure through holes 125 is confined to the annular chamber defined by the outer surface of metering tube section 157, the inner surface of barrel central chamber 122, and O-rings 156 and 159. And fluid flow at reservoir pressure from handle chamber 5 is confined to angled chamber 28, handle chamber 19 (sealed during assembly by means of O-ring 105, port cover 101, and screw 100), angled chamber 29, and the annular chamber between regulator piston 57, handle chamber 10, and O-rings 56 and 61 stabilizes at the fluid reservoir pressure. Consequently, there is no fluid flow through metering tube 150 or lower chuck body 210.

With atmospheric pressure on both ends of regulator piston 57, spring 55 extends to its initial length, and regulator piston 57 returns to its neutral position, blocking angled chamber 30 from fluid at reservoir pressure. The top surface of release piston 83 is therefore no longer exposed to reservoir pressure, and spring 77 pushes release pin 78 to its neutral position with chamfered tip 98 of release pin 78 held against metering tube 150 between metering tube cavity 167 and O-ring 166. Thus, after an inflation process has terminated, the components of the present invention return to a configuration and state ready for another inflation event.

Because handle chamber 6 has a cross-sectional area significantly smaller than any of the other fluid flow chambers in the present invention, handle chamber 6 restricts the fluid flow rate into all the chambers in the fluid flow path between handle chamber 6 and the inflatable device, and between handle chamber 6 and handle chamber 10 where pressure regulation occurs. Variations of the preferred embodiment can be achieved by designing the fluid flow rate restriction in any section of the fluid flow path that assures that the pressure build-up in handle chamber 10 is sufficiently controlled such that the pressure against the top surface of regulator piston 57 does not instantaneously reach reservoir pressure and consequently instantaneously initiate the automatic chuck disconnect process. One such variation could be achieved by eliminating the restriction of handle chamber 6, eliminating three of the holes 125, and then relying on the restriction created by the single remaining small diameter hole 125.

Premature initiation of the automatic chuck disconnect process can also be avoided with different ratios between the cross-sectional area of the chambers downstream of the flow restricting chamber and the flow restricting chamber itself. Although the preferred embodiment discloses a ratio between the smallest chamber downstream of the restricting handle chamber 6 (the annular area around the valve stem for the preferred embodiment) and chamber 6 of approximately three-to-one, that ratio is not mandatory. Depending on parameters including but not limited to the density of the fluid, the overall friction in the fluid flow path, including the effects of sharp turns or radiused bends, and spring rates of any springs or other components influenced by fluid pressure in a way to affect an automatic chuck disconnect or automatic fluid flow cessation, the ratio could theoretically be smaller than that of the preferred embodiment.

Reference to FIG. 3 should suggest to one versed in the mechanical arts another variation on the preferred embodiment. With provision of the functionality of compliant washer 200, rigid spacer 190, and valve stem actuator 185, middle chuck body 180 could be incorporated into lower chuck body 210 or metering tube 150, thereby eliminating one machined or extruded tube and simplifying the assembly process.

In the present invention, pressure adjuster 50 is a knurled knob on one end of a threaded shaft. Alternatively, the adjuster could be a lever, slider, cam, dial, wheel, or equivalent device.

An option that could be made available for the preferred embodiment is a means of fixing the preset automatic disconnect pressure, thereby precluding its change by unauthorized operators. Such a feature could be realized with a locking mechanism, such as a pin, weldment, or epoxy applied to pressure adjuster 50. For a fixed disconnect pressure, pressure adjuster 50 could also be designed as a fixed stop for spring 55, thus allowing no adjustment whatsoever. With a fixed stop, the present invention could be offered with a set of springs 55, each with a different spring rate (sometimes called spring constant) that would result in a set of discrete, non-adjustable, preset disconnect pressures.

Figure 10:
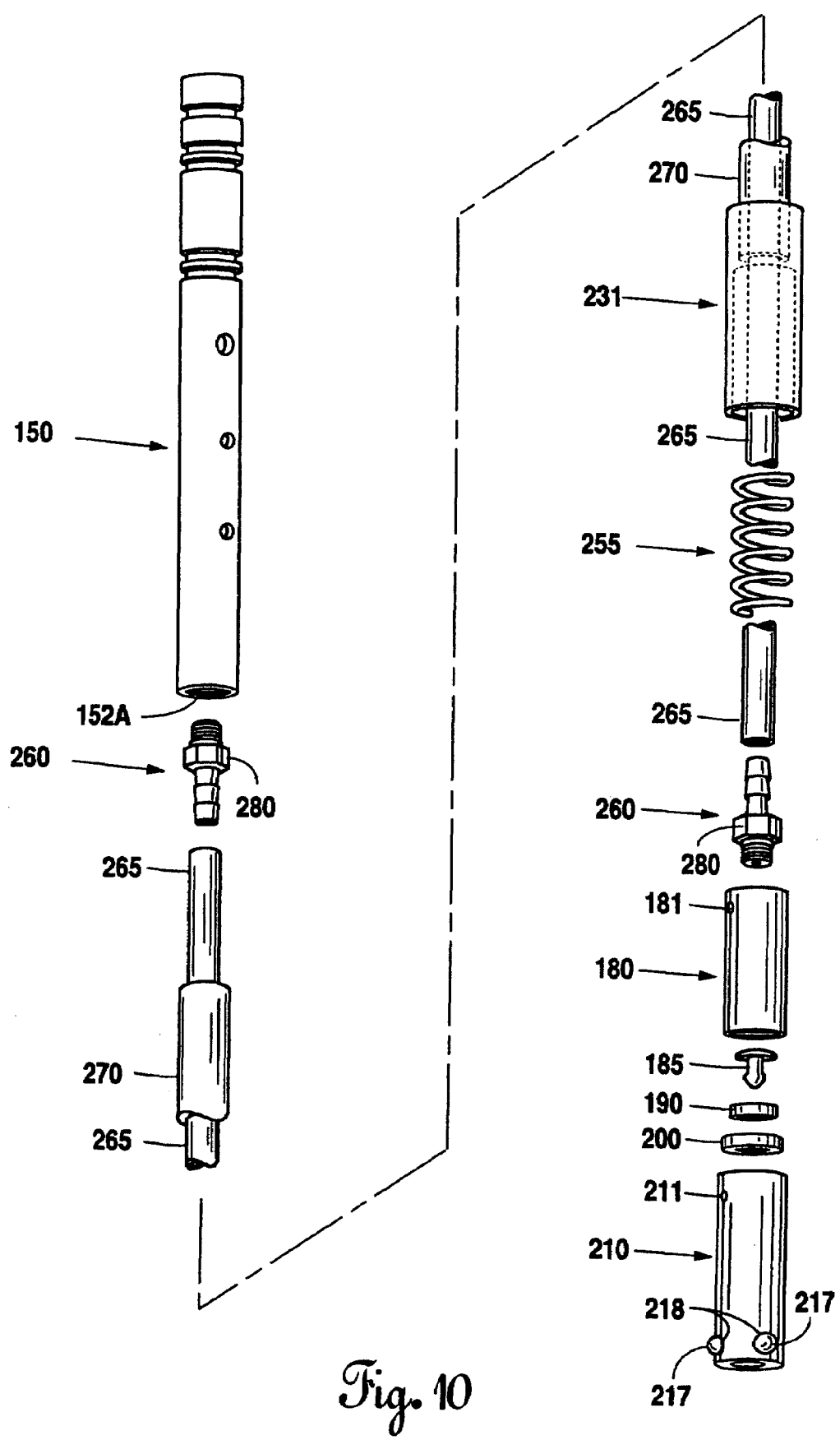
FIG. 10 is an exploded view of an alternative embodiment of the present invention.

FIG. 10 illustrates another present invention embodiment variation in which handle assembly 1 and barrel assembly 69 are separated by a flexible tube or hose. Such an embodiment permits an operator to inflate an inflatable device that might be too small to conveniently accommodate the length of barrel assembly 69 in close proximity to the valve of the inflatable device.

FIG. 10 illustrates how the present invention functions of grasping the valve of an inflatable device and, at a predetermined inflatable device pressure, automatically disconnecting from the valve, can be performed remotely from barrel 120. The forward end of metering tube 150 is threaded to form opening 152A and fitted with a first tube connector 260. The first end of flexible tube 265 is mounted on the forward end of tube connector 260. The first end of sheath 270, concentrically installed on tube 265, is pushed against the forward face of flange 280 on tube connector 260. Sheath 270 and flexible tube 265 are sized so that the latter is slideable inside the former.

The second end of sheath 270 is concentrically and firmly attached to the first end of remote chuck body 231. Such attachment may be press fit, adhesive, or other equivalent means. The second end of flexible tube 265, running inside sheath 270, extends through the first end of remote chuck body 231, the second end of remote chuck body 231, and compression spring 255, and is installed on a second tube connector 260.

Compliant washer 200, rigid spacer 190, and valve stem actuator 185 are installed inside lower chuck body 210. Middle chuck body 180 is inserted into lower chuck body 210 so that diametrical pin hole 181 in middle chuck body 180, diametrical pin hole 211 in lower chuck body 210, and a diametrical pin hole (not shown) in second tube connector 260 are aligned. Middle and lower chuck bodies 180 and 210, and second tube connector 260 are pinned together in the same manner as middle and lower chuck bodies 180 and 210 and metering tube 150 in barrel assembly 69 illustrated in FIG. 3. The pinning process must not block fluid flow through any of the pinned components. As an alternative to pinning, second tube connector 260 may be threaded into a middle chuck body 180 modified with internal threads, or made integral to middle chuck body 180. When the pinned or otherwise attached components are assembled, middle chuck body 180 is partially inside lower chuck body 210, which, along with spring 255, is partially inside remote chuck body 231.

From FIG. 10 it can be seen that flexible tube 265 acts as an extension of metering tube 150, and functions as a link in the transfer of force from trigger 240 to remote chuck body 210 while also acting as part of the path for fluid flow from metering tube center bore 152 to the inflatable device. As with the preferred embodiment, the operator of the present invention in its FIG. 10 alternative embodiment pushes remote chuck body 231 and lower chuck body 210 onto the valve of an inflatable device (not shown) so that rubber washer 200 contacts the valve, and valve stem actuator 185 depresses the valve stem sufficiently to permit fluid flow into the inflatable device. Chuck balls 217 contact the outer surface of the valve.

Applying force to remote chuck body 231 and lower chuck body 210 sufficient to assure that valve stem actuator 185 keeps the valve stem of the inflatable device depressed, the operator pulls trigger 240 rearward. Because metering tube 150 is attached to flexible tube 265, which is in turn attached to middle and lower chuck bodies 180 and 210, because sheath 270 is selected to resist compression, and because lower chuck body 210 receives the valve of an inflatable device, pulling trigger 240 rearward results in forward movement of the handle and barrel assemblies, and movement of sheath 270 toward the valve. That movement of sheath 270 moves remote chuck body 231 toward the valve, partially compressing spring 255. Consequently, the tapered inside surface of remote chuck body 231 is pushed further onto lower chuck body 210, forcing chuck balls 217 deeper in chuck holes 218. Thus the portions of chuck balls 217 protruding inside the inner diameter of lower chuck body 210 impose a circumferential radial force on the captured valve of the inflatable device. As the narrowing section of the tapered inside surface of remote chuck body 231 is forced further onto lower chuck body 210, chuck balls 217 grip the valve with greater force.

Fluid flowing from metering tube 150 passes through flexible tube 265 into the valve. When the pressure in the inflatable device reaches the predetermined desired value, lower chuck body 210 is automatically disconnected from the valve in the same manner, with one exception, as it is disconnected in the preferred embodiment. In the FIG. 10 alternative embodiment, the automatic disconnect feature is assisted by the conserved energy in spring 255 that was compressed in the process of attaching lower chuck body 210 to the valve of the inflatable device. The additional force of disconnect is needed to overcome the friction between flexible tube 265 and sheath 270 inherent in the FIG. 10 alternative embodiment.

It will be apparent to those with ordinary skill in the relevant art having the benefit of this disclosure that the present invention provides an inflation device with an easily attachable hands-free chuck that is automatically detached from the valve of an inflatable device at a preset pressure. It is understood that the forms of the invention shown and described in the detailed description and the drawings are to be taken merely as presently preferred examples and that the invention is limited only by the language of the claims. The drawings and detailed description presented herein are not intended to limit the invention to the particular embodiments disclosed. While the present invention has been described in terms of one preferred embodiment and a few variations thereof, it will be apparent to those skilled in the art that form and detail modifications can be made to those embodiments without departing from the spirit or scope of the invention.

I claim:

1. An apparatus for injecting fluid into an inflatable device, said apparatus comprising:

a first chamber capable of being in communication with a supply of fluid, said first chamber being capable of maintaining fluid in said first chamber at a pressure substantially equal to the pressure of said supply fluid;

a second chamber capable of communicating with said inflatable device, said second chamber also being capable of communicating with said first chamber, said second chamber also being capable of dynamically maintaining fluid in said second chamber at a pressure substantially equal to the pressure of said inflatable device during an inflation event;

a first spring-loaded piston capable of moving in response to said second chamber fluid;

a third chamber capable of receiving fluid from said first chamber in response to said motion of said first spring-loaded piston;

a second spring-loaded piston capable of moving in response to said third chamber fluid, said motion of said second spring-loaded piston capable of terminating said inflation event substantially simultaneously with the attainment by said second chamber fluid pressure of a predetermined level;

a pressure adjuster, said adjuster being capable of providing an operator the ability to adjustably set said predetermined level;

a restrictor of the fluid mass flow rate between at least one said first chamber and at least one said second chamber;

a first tube having a first and a second end and a plurality of radial through holes distributed around and near said first end;

a sphere corresponding to each said radial through hole, each said sphere having a diameter slightly larger than the diameter of said corresponding radial through hole;

a second tube having a first and a second end, said first end of said second tube having a funnel shaped entry, said entry being capable of receiving first a second end of said first tube and then said first end of said first tube, said second tube being sized so that each said sphere is held between a said radial through hole in said first end of said first tube and said funnel shaped entry of said second tube when said first tube is located so that said spheres are inside said second tube and near said largest diameter of said funnel shaped entry of said second tube; and a trigger providing an operator the ability to force said second tube onto said first tube while said first end of said first tube is held onto a valve of said inflatable device such that said spheres contact said valve's external surface and exert a circumferential radial force on said valve.

2. An apparatus as in claim 1 being further capable, substantially simultaneously with the attainment by said second chamber fluid pressure of said predetermined level, of completely breaking all contact between said second chamber and said inflatable device.

3. An apparatus as in claim 1 wherein one or more of said second chambers communicates with said first tube through two or more flexible hoses, at least one of said hoses being capable of providing communication of fluid between said second chamber and said first tube, and at least one of said hoses being capable of providing structural rigidity between said second chamber and said first tube.

4. An apparatus for injecting fluid into an inflatable device, said apparatus comprising:

a handle assembly and a barrel assembly capable of communicating with each other, said barrel assembly being capable of providing connection to and communication with a valve of said inflatable device, said handle assembly being capable of removable connection to, and communication with, a supply of fluid, said handle assembly having a restrictor of the fluid mass flow rate between a first chamber containing fluid from said supply at substantially the same pressure as the pressure of said supply fluid, and a second chamber at substantially the same pressure as the pressure of said inflatable device, said handle assembly having a fluid path capable of bleeding fluid from said second chamber into a third chamber at substantially the same increasing pressure as the pressure of said inflatable device as said inflatable device is being inflated, said third chamber containing a first spring-loaded piston that automatically directs fluid from said first chamber at substantially the same pressure as the pressure of said supply fluid to a fourth chamber where said pressure of said bled fluid activates a second spring-loaded piston capable of automatically terminating said connection and communication between said barrel assembly and said inflatable device when said third chamber pressure reaches an operator-selected predetermined level, and automatically terminating fluid flow through said barrel assembly when said third chamber pressure reaches an operator-selected predetermined level;

a connection between said barrel assembly and said inflatable device comprising a first tube having a first and a second end and a plurality of radial through holes distributed around and near said first end, a sphere corresponding to each said radial through hole, each said sphere having a diameter slightly larger than the diameter of said corresponding radial through hole, a second tube having a first and a second end, said first end of said second tube having a funnel shaped entry, said entry being capable of receiving first a second end of said first tube and then said first end of said first tube, said second tube being sized so that each said sphere is held between a said radial through hole in said first end of said first tube and said funnel shaped entry of said second tube when said first tube is located so that said spheres are inside said second tube and near said largest diameter of said funnel shaped entry of said second tube;

a trigger providing an operator the ability to force said second tube onto said first tube while said first end of said first tube is held onto said valve of said inflatable device such that said spheres contact said valve's external surface and exert a circumferential radial force on said valve; and a device capable of depressing a valve stem in said valve of said inflatable device when said first tube is pushed onto said valve.

5. An apparatus as in claim 4 further comprising a pressure adjuster, said adjuster being capable of providing an operator the ability to adjustably set said predetermined level.

6. An apparatus as in claim 4 wherein said handle assembly further comprises a means for filtering said supply fluid.

7. An apparatus as in claim 4 wherein said barrel assembly further comprises a means for filtering said supply fluid.

8. An apparatus as in claim 4 wherein said barrel assembly communicates with said first tube through two concentric flexible hoses, said first hose being capable of providing communication of fluid between said barrel assembly and said first tube, and said second hose being capable of providing rigidity between said barrel assembly and said first tube.

* * * * *